United States Patent
Sato et al.

(10) Patent No.: US 7,053,172 B2
(45) Date of Patent: *May 30, 2006

(54) FUEL-BARRIER POLYAMIDE RESIN AND MULTILAYER SHAPED ARTICLE

(75) Inventors: Kazunobu Sato, Kanagawa (JP); Kazunobu Maruo, Kanagawa (JP); Jun Mitadera, Kanagawa (JP); Masashi Kurokawa, Kanagawa (JP)

(73) Assignee: Mitsubishi Gas Chemical Co., Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/837,699

(22) Filed: May 4, 2004

(65) Prior Publication Data

US 2004/0230028 A1 Nov. 18, 2004

(30) Foreign Application Priority Data

May 6, 2003 (JP) ............................. 2003-128208

(51) Int. Cl.
*C08G 69/08* (2006.01)
*B32B 27/00* (2006.01)

(52) U.S. Cl. ...................... 528/347; 528/310; 528/312; 528/313; 528/322; 528/332; 528/335; 528/336; 528/337; 528/339; 528/340; 524/414; 524/600; 524/602; 524/606; 428/411.1; 428/474.4; 428/34.4; 428/34.7; 428/36.9

(58) Field of Classification Search ................ 528/310, 528/312, 313, 322, 335–336, 337, 339, 340, 528/347; 428/411.1, 474.4, 34.1, 34.7, 36.9
See application file for complete search history.

(56) References Cited

U.S. PATENT DOCUMENTS

| 6,515,099 B1 * | 2/2003 | Sato et al. ................... 528/310 |
| 6,841,651 B1 * | 1/2005 | Maruo et al. ............... 528/310 |
| 2003/0114591 A1 * | 6/2003 | Sato et al. ................... 525/178 |

FOREIGN PATENT DOCUMENTS

| EP | 0 409 666 | 1/1991 |
| EP | 1 413 429 | 4/2004 |
| WO | WO 00/34372 | 6/2000 |

* cited by examiner

*Primary Examiner*—P. Hampton Hightower
(74) *Attorney, Agent, or Firm*—Antonelli, Terry, Stout and Kraus, LLP.

(57) ABSTRACT

The fuel-barrier polyamide resin of the present invention is a product of the polycondensation of a diamine component comprising 70 mol % or higher of m-xylylenediamine and a dicarboxylic acid component comprising 70 mol % or higher of a mixed dicarboxylic acid which comprises a $C_4$ to $C_{20}$ $\alpha,\omega$-linear aliphatic dicarboxylic acid and at least one dicarboxylic acid selected from the group consisting of isophthalic acid and naphthalenedicarboxylic acid in a molar ratio of 30:70 to 95:5. The polyamide resin is excellent in not only fuel-barrier property and heat resistance, but also moldability and recyclability, and therefore suitably used as a barrier material of fuel containers.

17 Claims, No Drawings

FUEL-BARRIER POLYAMIDE RESIN AND MULTILAYER SHAPED ARTICLE

BACKGROUND OF THE INVENTION

1. Field of the Invention

The present invention relates to fuel-barrier polyamide resins and multilayer shaped articles, and more particularly, relates to polyamide resins that are minimized in the fuel permeability, excellent in heat resistance and moldability and suitably used as a material for fuel containers, and further relates to multilayer molded articles using the polyamide resins.

2. Description of the Prior Art

Polyamide resins have been extensively used in applications such as not only injection-molding materials for automobiles and electric or electronic parts, but also packaging materials for foodstuffs, beverages, drugs and electronic parts, because of their excellent mechanical properties. Among the polyamides, polyamides produced by the polycondensation of xylylenediamine and aliphatic dicarboxylic acid (hereinafter occasionally referred to as "MX nylon"), especially polyamides produced from m-xylylenediamine and adipic acid (hereinafter occasionally referred to as "polyamide MXD6"), exhibit a low permeability to gaseous substances such as oxygen and carbon dioxide gas and, therefore, have now been used as gas-barrier materials for shaped articles such as films and bottles.

In recent years, from the viewpoints of reducing the weight, dispensing with rust-proofing treatment, making design liberty greater, reducing the number of steps and making production process fully automated, resin-made fuel containers produced by blow-molding, etc. have been noticed as fuel storage containers, and increasingly used as a substitute for metal-made fuel containers.

Polyethylene (high-density polyethylene) conventionally used for the fuel containers is excellent in mechanical strength and moldability, and inexpensive, but fails to meet recent regulations on fuel permeation because of its poor barrier property to fuels.

To solve the above problems, there have been proposed a method of subjecting an inside surface of the containers to fluorine treatment, and also proposed multilayer containers having an intermediate barrier layer made of a fuel-barrier polyamides or ethylene-vinyl alcohol copolymer between polyethylene layers (for example, Japanese Patent Application Laid-Open Nos. 3-32815, 5-345349, 6-340033, 9-29904 and 2001-97053). Among these proposals, the fluorination treatment has problems such as less safety due to the use of harmful gases and difficulty in recovery after the treatment, and therefore has been rarely employed at present. The proposed multilayer containers are somewhat successful in reducing the fuel permeability because of the barrier layer, but fail to show a fully satisfactory fuel-barrier property. If the thickness of the barrier layer is increased, there tend to occur problems such as deteriorated shock absorption upon collision as well as increase in weight and costs. Therefore, such multilayer containers are difficult to fully meet the regulations that will be made stricter. Also, the use of ethanol as fuel has been recently studied and put into practice, because the addition of ethanol to gasoline allows to reduce the use of fossil fuel as well as reduce the emmision of carbon dioxide gas. However, nylon 6, ethylene-vinyl alcohol copolymers, etc. are poor in barrier property to alcohols. Therefore, it has been strongly demanded to provide materials having a higher barrier property to fuels and alcohols.

The fuel containers are generally produced by a direct blowing method. Since the known barrier materials are poor in heat resistance, the gelation is likely to occur, thereby limiting the production conditions. In addition, there are various problems in the productivity and the effective use of materials because of the need of recycling the flash, formed during the molding operation and the need of changing into a resin with more higher thermal stability when the machine is started and stopped. In particular, in the direct blow-molding method, the use of resins having a low melt viscosity leads to occurrence of draw-down, which results in problems such as the production of molded articles having an excessively small wall thickness and uneven wall thickness. Further, the condition of an excessively high molding temperature tends to lower the viscosity of molten polyolefins for the outer layer of the fuel containers, thereby promoting occurrence of draw-down.

SUMMARY OF THE INVENTION

An object of the present invention is to solve the above problems encountered in the conventional fuel container, and provide a barrier material that is excellent in fuel-barrier property, heat resistance and moldability.

As a result of extensive studies in view of the above object, the inventors have found that a polyamide resin constituted by specific monomers in a specific ratio is excellent in fuel barrier property and heat resistance as well as moldability and recyclability, and therefore, capable of suitably using as a barrier material for fuel containers. The present invention has been accomplished on the basis of this finding.

Thus, the present invention provides a fuel-barrier polyamide resin produced by the polycondensation of a diamine component comprising 70 mol % or higher of m-xylylenediamine and a dicarboxylic acid component comprising 70 mol % or higher of a mixed dicarboxylic acid which comprises a $C_4$ to $C_{20}$ α,ω-linear aliphatic dicarboxylic acid and at least one dicarboxylic acid selected from the group consisting of isophthalic acid and naphthalenedicarboxylic acid in a molar ratio of 30:70 to 95:5.

The present invention also provides a multilayer molded article using the above polyamide resin.

DETAILED DESCRIPTION OF THE INVENTION

The polyamide resin of the present invention is produced by polycondensing a diamine component comprising 70 mol % or higher of m-xylylenediamine with a dicarboxylic acid component comprising 70 mol % or higher of a mixed dicarboxylic acid which comprises a $C_4$ to $C_{20}$ α,ω-linear aliphatic dicarboxylic acid and at least one dicarboxylic acid selected from the group consisting of isophthalic acid and naphthalenedicarboxylic acid in a molar ratio of 30:70 to 95:5.

The diamine component may contain an additional diamine other than m-xylylenediamine in an amount of 30 mol % or less based on the total amount of the diamine component. Examples thereof include aliphatic diamines such as tetramethylenediamine, pentamethylenediamine, hexamethylenediamine, octamethylenediamine and nonamethylenediamine; aromatic diamines such as p-phenylenediamine and p-xylylenediamine; and alicyclic diamines such as bis(aminomethyl)cyclohexane.

The dicarboxylic acid component used as the raw material of the polyamide resin of the present invention contains a mixed dicarboxylic acid in an amount of 70 mol % or higher, which comprises a $C_4$ to $C_{20}$ α,ω-linear aliphatic dicarboxylic acid and at least one dicarboxylic acid selected from the group consisting of isophthalic acid and naphthalenedicarboxylic acid in a molar ratio of 30:70 to 95:5. When combinedly used, the molar ratio of isophthalic acid and naphthalenedicarboxylic acid is preferably 99:1 to 1:99, more preferably 95:5 to 5:95.

Examples of the $C_4$ to $C_{20}$ α,ω-linear aliphatic dicarboxylic acid include aliphatic dicarboxylic acids such as succinic acid, glutaric acid, pimelic acid, suberic acid, azelaic acid, adipic acid, sebacic acid, undecanedioic acid and dodecandioic acid, with adipic acid being preferred.

Examples of the naphthalenedicarboxylic acid include, but are not particularly limited to; isomers thereof such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid and 2,7-naphthalenedicarboxylic acid.

When the mixed dicarboxylic acid is a mixture of the $C_4$ to $C_{20}$ α,ω-linear aliphatic dicarboxylic acid and isophthalic acid, the mixing ratio by mole is preferably 3:7 to 9:1, more preferably 4:6 to 85:15, and still more preferably 45:55 to 80:20. The above content range of isophthalic acid improves the fuel barrier property, especially barrier property to fuels containing methanol, ethanol or methyl t-butyl ether. When the mixed dicarboxylic acid is a mixture of the $C_4$ to $C_{20}$ α,ω-linear aliphatic dicarboxylic acid and naphthalenedicarboxylic acid, the mixing ratio by mole is preferably 40:60 to 90:10 and more preferably 45:55 to 85:15. The above content range of naphthalenedicarboxylic acid improves the fuel barrier property, especially barrier property to fuels containing methanol or ethanol.

The use of the mixed dicarboxylic acid lowers the melting point of the resultant polyamide resin as compared to the sole use of the $C_4$ to $C_{20}$ α,ω-linear aliphatic dicarboxylic acid, allowing the molding at lower temperatures to reduce the production energy and shorten the molding cycle. In addition, the melt viscosity is increased to minimize the molding defect such as draw-down and improve the moldability of the polyamide resin.

The dicarboxylic component may contain an additional carboxylic acid other than the mixed dicarboxylic acid in an amount of 30 mol % or less based on the total amount of the dicarboxylic acid component. Examples thereof include aliphatic dicarboxylic acid such as azelaic acid and sebacic acid; monocarboxylic acids such as benzoic acid, propionic acid and butyric acid; polybasic carboxylic acids such as trimellitic acid and pyromellitic acid; and carboxylic anhydrides such as trimellitic anhydride and pyromellitic anhydride.

The polyamide resin of the present invention may also contain lactams such as ε-caprolactam, ω-laurolactam and ω-enanthlactam; and amino acids such as 6-aminocaproic acid, 7-aminoheptanoic acid, 11-aminoundecanoic acid, 12-aminododecanoic acid, 9-aminononanoic acid and p-aminomethylbenzoic acid, unless adversely affecting the properties of the polyamide resin.

The polyamide resin is produced by melt-polycondensation method. For example, a nylon salt of m-xylylenediamine, adipic acid and isophthalic acid, or a nylon salt of m-xylylenediamine, adipic acid and naphthalenedicarboxylic acid, is heated under pressure in the presence of water, and then, melt-polymerized while removing water added and water eliminated by the condensation. Alternatively, the melt polycondensation may be carried out under atmospheric pressure by directly adding m-xylylenediamine into a molten mixture of adipic acid and isophthalic acid or a molten mixture of adipic acid and naphthalenedicarboxylic acid. In this method, m-xylylenediamine is continuously added to maintain the system at temperatures higher than the melting points of oligoamides and polyamides being produced, thereby avoiding the solidification of the reaction system.

The relatively low-molecular weight polyamide obtained by the melt polycondensation usually has a relative viscosity of 2.28 or lower when measured on a solution of one gram of the polyamide resin in 100 ml of a 96% sulfuric acid. By controlling the relative viscosity to 2.28 or lower, a high-quality polyamide with little gelled substances and a good color tone can be obtained. However, such a polyamide tends to cause draw-down or local accumulation of polyamide at the ends of sheet when made into multilayer films, sheets or multilayer containers such as bottles, because of its low viscosity. By adding isophthalic acid or naphthalenedicarboxylic acid into to the dicarboxylic acid component in the above range, the melt viscosity can be increased while maintaining the relative viscosity low and the melting point can be reduced to lower the molding temperature (melting point +10 to 30° C.; 180° C.+10 to 30° C. if amorphous), thereby achieving a sufficient melt viscosity at the molding temperatures. Therefore, a subsequent step for increasing the viscosity of the polyamide resin such as solid-phase polymerization is not required to allow an economical production of materials.

The melting point of the polyamide resin is preferably 160 to 220° C. and more preferably 170 to 210° C., when the mixed dicarboxylic acid is a mixture of the $C_4$ to $C_{20}$ α,ω-linear aliphatic dicarboxylic acid and isophthalic acid. When the mixed dicarboxylic acid is a mixture of the $C_4$ to $C_{20}$ α,ω-linear aliphatic dicarboxylic acid and naphthalenedicarboxylic acid, the melting point is preferably 160 to 225° C. and more preferably 170 to 220° C. By allowing the melting point of the polyamide resin to approach to those of the other thermoplastic resins, the molding defects such as uneven wall thickness due to the difference in the molding temperature between the polyamide resin and the other thermoplastic resins, malodor and discoloration due to deteriorated resins are prevented from occurring during the production of the multilayer molded articles.

The melt viscosity of the polyamide resin is preferably 1000 to 5000 Pa·s and more preferably 1500 to 4000 Pa·s when measured at a molding temperature (generally 160 to 225° C.) and a shear rate of 100 $sec^{-1}$, when the mixed dicarboxylic acid is a mixture of the $C_4$ to $C_{20}$ α,ω-linear aliphatic dicarboxylic acid and isophthalic acid. When the mixed dicarboxylic acid is a mixture of the $C_4$ to $C_{20}$ α,ω-linear aliphatic dicarboxylic acid and naphthalenedicarboxylic acid, the melt viscosity is preferably 200 to 5000 Pa·s and more preferably 300 to 4000 Pa·s. When the melt viscosity is less than the above range, draw-down occurs during the production of the multilayer molded articles by blow-molding method, etc., and the mechanical strength is unfavorably reduced. The polyamide resin having a melt viscosity exceeding the above range is practically difficult to produce, and an excessively large load is needed for its molding.

The polyamide resin of the present invention preferably has a glass transition temperature of 90 to 130° C. With a glass transition temperature of 90° C. or higher, the barrier property at high temperatures becomes excellent.

In the present invention, the fuel permeability of the polyamide resin measured in the manner described below is preferably 0.1 to 5 g/m²·day, more preferably 0.1 to 1 g/m²·day.

The polyamide resin of the present invention may also contain smectite treated with an organic swelling agent. The smectite is dioctahedral type or trioctahedral type phyllosilicate having an electric charge density of 0.25 to 0.6. Examples of the dioctahedral type phyllosilicates include montmorillonite and beidellite. Examples of the trioctahedral type phyllosilicates include hectorite and saponite. Of these phyllosilicates, preferred is montmorillonite.

The smectite treated with an organic swelling agent referred to herein is a phyllosilicate having its interlaminar spacing spread by contacting the phyllosilicate with the organic swelling agent such as high-molecular compounds and organic compounds.

The organic swelling agent is preferably selected from quaternary ammonium salts (preferably halide such as chloride and bromide) and more preferably quaternary ammonium salts having at least one alkyl or alkenyl group having 12 or more carbon atoms.

Examples of the organic swelling agents include trimethylalkylammonium salts such as trimethyldodecylammonium salts, trimethyltetradecylammonium salts, trimethylhexadecylammonium salts, trimethyloctadecylammonium salts and trimethyleicosylammonium salts; trimethylalkenylammonium salts such as trimethyloctadecenylammonium salts and trimethyloctadecadienylammonium salts; triethylalkylammonium salts such as triethyldodecylammonium salts, triethyltetradecylammonium salts, triethylhexadecylammonium salts and triethyloctadecylammonium salts; tributylalkylammonium salts such as tributyldodecylammonium salts, tributyltetradecylammonium salts, tributylhexadecylammonium salts and tributyloctadecylammonium salts; dimethyldialkylammonium salts such as dimethyldidodecylammonium salts, dimethylditetradecylammonium salts, dimethyldihexadecylammonium salts, dimethyldioctadecylammonium salts and dimethylditallowammonium salts; dimethyldialkenylammonium salts such as dimethyldioctadecenylammonium salts and dimethyldioctadecadienylammonium salts; diethyldialkylammonium salts such as diethyldidodecylammonium salts, diethylditetradecylammonium salts, diethyldihexadecylammonium salts and diethyldioctadecylammonium salts; dibutyldialkylammonium salts such as dibutyldidodecylammonium salts, dibutylditetradecylammonium salts, dibutyldihexadecylammonium salts and dibutyldioctadecylammonium salts; methylbenzyldialkylammonium salts such as methylbenzyldihexadecylammonium salts; dibenzyldialkylammonium salts such as dibenzyldihexadecylammonium salts; trialkylmethylammonium salts such as tridodecylmethylammonium salts, tritetradecylmethylammonium salts and trioctadecylmethylammonium salts; trialkylethylammonium salts such as tridodecylethylammonium salts; trialkylbutylammonium salts such as tridodecylbutylammonium salts; and ω-amino acids such as 4-amino-n-butyric acid, 6-amino-n-caproic acid, 8-aminocaprylic acid, 10-aminodecanoic acid, 12-aminododecanoic acid, 14-aminotetradecanoic acid, 16amino-hexadecanoic acid and 18amino-octadecanoic acid. In addition, ammonium salts having a hydroxyl group and/or an ether group may also be used as the organic swelling agent. Examples thereof include methyl dihydroxyethyl hydrogenated tallow ammonium salts and quaternary ammonium salts containing at least one alkylene glycol residue such as methyldialkyl(PAG)ammonium salts, ethyldialkyl(PAG)ammonium salts, butyldialkyl(PAG)ammonium salts, dimethylbis(PAG)ammonium salts, diethylbis(PAG)ammonium salts, dibutylbis(PAG)ammonium salts, methylalkylbis(PAG)ammonium salts, ethylalkylbis(PAG) ammonium salts, butylalkylbis(PAG)ammonium salts, methyltri(PAG)ammonium salts, ethyltri(PAG)ammonium salts, butyltri(PAG)ammonium salts and tetra(PAG)ammonium salts wherein the "alkyl" represents an alkyl group having 12 or more carbon atoms such as dodecyl, tetradecyl, hexadecyl, octadecyl and eicosyl; and PAG represents a polyalkylene glycol residue, preferably a polyethylene glycol residue or a polypropylene glycol residue having 20 carbon atoms or less. Of these organic swelling agents, preferred are trimethyldodecylammonium salts, trimethyltetradecylammonium salts, trimethylhexadecylammonium salts, trimethyloctadecylammonium salts, dimethyldidodecylammonium salts, dimethylditetradecylammonium salts, dimethyldihexadecylammonium salts, dimethyldioctadecylammonium salts, dimethylditallowammonium salts and methyl dihydroxyethyl hydrogenated tallow ammonium salts. These organic swelling agents may be used alone or in combination of two or more.

The blending amount of the smectite treated with the organic swelling agent is preferably 1 to 20% by weight and more preferably 1.5 to 15% by weight based on the total weight of the polyamide resin and the smectite. When 1% by weight or higher, the gas-barrier property is improved. A blending amount exceeding 20% by weight creates no additional effect on improving the gas-barrier property.

The smectite should be uniformly dispersed throughout the polyamide resin without locally forming agglomerates. The uniform dispersion referred to herein means that the layers of phyllosilicate in the polyamide resin is separated into flat plates, 50% or more of which are spaced at an interlaminar spacing of 5 nm or more. The interlaminar spacing means a distance between the gravity centers of flat plates. The larger the interlaminar spacing, the smectite is dispersed more uniformly to give the final film, sheet and hollow container having a good appearance such as transparency and an improved barrier property to gaseous substances such as oxygen and carbon dioxide gas.

The smectite is melt-kneaded with the polyamide resin by known methods, for example, by a method in which the smectite is added under stirring during the melt-polymerization for producing the polyamide resin, a method in which the smectite and the polyamide resin are melt-kneaded in various general extruders such as single-screw or twin-screw extruders, etc., with the melt-kneading method using a twin-screw extruder being preferred in view of productivity and flexibility.

The melt-kneading is preferably performed by using a screw having at least one reverse flighted element and/or kneading disk for forming a dwelling zone and allowing the polyamide resin to be partly retained at each dwelling zone, while controlling the melt-kneading temperature to 180 to 260° C. and the residence time to 5 min or less.

Melt-kneading temperatures outside the above range are likely to cause a poor dispersion of the smectite. The dwelling zone of the screw improves the dispersion of the phyllosilicate. In view of a good dispersibility and the prevention of thermal decomposition and gel formation, the melt-kneading time is preferably 1 to 5 min.

The other thermoplastic resins usable in the multilayer molded articles may be polyolefins, polystyrenes, polyesters, polycarbonates and polyamides. Examples of the polyolefins include linear low-density polyethylene, low-density polyethylene, medium-density polyethylene, high-density polyethylene, ultrahigh-molecular high-density polyethylene, polypropylene, copolymers of at least two olefins selected from ethylene, propylene, butene, etc., and mixtures thereof. Of these polyolefins, ultrahigh-molecular high-density polyethylene is preferred in view of the prevention of draw-down in blow-molding process and its excellence in impact resistance, fuel-swelling resistance and water resistance. The polyolefins, polystyrenes, polyesters, polycarbonates and polyamides exemplified as the other thermoplastic resins usable in the present invention may be mixed with each other, or may be mixed with another resin such as elastomers or with various additives such as carbon black and flame retardants.

The multilayer molded articles of the present invention are multilayer containers in the form of bottle, cup, tray and tank, each comprising a laminate having at least one gas-barrier layer made of the polyamide resin and at least one layer made of a thermoplastic resin. The multilayer molded articles may be produced by extrusion molding method followed by thermoforming, melt molding method such as blow-molding, co-injection molding method such as sandwich forming and two-color injection molding, although not specifically limited thereto. More specifically, the multilayer molded articles are produced by a method in which a multilayer sheet formed by a T-die extruder is thermoformed and then bonded by adhesive or welding to produce a multilayer container; a method in which a multilayer cylindrical parison from an injection molding machine or an extrude is blow-molded; or a co-injection molding method in which two more kinds of molten resins are sequentially injected into a mold cavity.

The thickness of each layer depends on the shape of the multilayer molded article, and generally, 0.001 to 1 mm for the gas-barrier layer and 0.01 to 20 mm for the thermoplastic resin layer.

An adhesive resin layer (adhesive layer) may be provided between each pair of layers selected from the barrier layers, the thermoplastic resin layers, etc. which constitute the multilayer molded articles of the present invention. Examples of adhesive resins for bonding thermoplastic resin layers made of polyolefins include polyethylene, polypropylene and copolymers of olefins such as ethylene, propylene and butene, each being modified with maleic acid, acrylic acid, methacrylic acid, itaconic acid or anhydrides thereof. Examples of adhesive resins for bonding thermoplastic resin layers made of polyesters or polycarbonates include ethylene-vinyl acetate copolymers and ethylene-acrylic acid copolymers each crosslinked by alkali metal or alkali earth metal, and ethylene-acrylic acid ester copolymers. However, the adhesive resins are not particularly limited to the above compounds.

The polyamide resin may be blended with the above thermoplastic resins, preferably in the presence of a compatibilizer such as the adhesive resins and olefin- and/or styrene-based copolymers modified with unsaturated carboxylic acid or anhydride thereof. The blending is preferably carried out so that the dispersed polyamide resin forms continuous layers by appropriately controlling the viscosity and the addition amount of each of the polyamide resin and the thermoplastic resin. The blending may be effected by a known method, for example, a method in which a dry blend of pellets of the respective resins is dispersed in an extruder, a method in which a powdery mixture of the respective resins is dispersed in an extruder, and a method in which the dispersion is conducted in a mixer, although not particularly limited thereto.

The flash and molding defect may be re-melted and recycled as a recycle layer of the multilayer molded article. The recycle layer is preferably disposed outside of the barrier layer in view of mechanical strength.

Each layer of the multilayer molded article of the present invention may further contain lubricant, mold-release agent, antioxidant, ultraviolet absorber, phyllosilicate, or inorganic or organic metal salt or complex of Co, Mn, Zn, etc., unless the addition thereof adversely affects the objects of the present invention.

The present invention will be described in more detail below with reference to the following examples and comparative examples. However, these examples are only illustrative and not intended to limit the invention thereto. In the following examples and comparative examples, polyamide resins and multilayer molded articles were evaluated by the following methods.

(1) End Amino Concentration of Polyamide Resin

Accurately weighed polyamide (0.3 to 0.5 g) was dissolved in 30 cc of a mixed solvent, phenol/ethanol=4/1 by volume, at 20 to 30° C. under stirring. The end amino concentration was determined by neutralization titration of the resulting complete solution with a 1/100 N hydrochloric acid using an automatic titration device available from Mitsubishi Chemical Corp.

(2) End Carboxyl Concentration of Polyamide Resin

Accurately weighed polyamide (0.3 to 0.5 g) was dissolved in 30 cc of benzyl alcohol at 160 to 180° C. with stirring in a nitrogen flow. The resulting complete solution was cooled to 80° C. or lower in a nitrogen flow and mixed with 10 cc of methanol under stirring. The end carboxyl concentration was determined by neutralization titration with a 1/100 N sodium hydroxide aqueous solution using an automatic titration device available from Mitsubishi Chemical Corp.

(3) Reaction Molar Ratio of Polyamide Resin

Calculated from end amino concentration and end carboxyl concentration according to the following formula:

$$\text{Reaction Molar Ratio} = (1 - 18.015 \times [NH_2] - 73.07 \times A) / (1 - 18.015 \times [COOH] - 68.10 \times A),$$

wherein $[NH_2]$ is end amino concentration, $[COOH]$ is end carboxyl concentration, and A is $[COOH]-[NH_2]$.

(4) Relative Viscosity of Polyamide Resin

Accurately weighed one gram of polyamide resin was dissolved in 100 cc of 96% sulfuric acid at 20 to 30° C. under stirring. Immediately after complete dissolution, 5 cc of the resulting solution was placed in a Canon Fenske viscometer, and the viscometer was allowed to stand in a thermostatic chamber maintained at 25±0.03° C. for 10 min. Then, a dropping time (t) of the solution was measured. Also, a dropping time ($t_0$) of the 96% sulfuric acid was measured. The relative viscosity was calculated from the measured t and $t_0$ according to the following formula:

$$\text{Relative Viscosity} = t/t_0.$$

(5) Water Content

Measured at a temperature of the melting point −5° C. for 50 min in a nitrogen atmosphere by a trace water content meter "CA-05" available from Mitsubishi Chemical Corp.

(6) Melting Point of Polyamide Resin

Measured at a temperature rise rate of 10° C./min using a heat flux differential scanning calorimeter available from Shimadzu Corporation.

(7) Melt Viscosity of Polyamide Resin

Measured at a resin temperature of 210 or 230° C. and a shear rate of 100 sec$^{-1}$ using Capirograph 1C (L/D of capillary: 10/1) available from Toyo Seiki Seisaku-Sho, Ltd. However, Nylon MXD6 was measured at 260° C.

(8) Gel Concentration

A disk cavity having an inner diameter of 36 mm and a depth of 1 mm of a PTFE plate was filled with 1.2 g of resin and hermetically closed by a PTFE lid so as not to leave a gas phase portion. The resin in the cavity was heat-pressed at 210° C. under a load of 100 kg/cm$^2$ for 30 s to obtain a disk. The disk was placed in a cavity of the same dimension of another PTFE plate which had been previously heated to 210° C., held therein under a press load of 100 kg/cm$^2$ for 72 h, and then rapidly cooled to room temperature and removed from the cavity to prepare a sample. Accurately weighed 100 mg of the resin thus treated was dissolved in 20 cc of hexafluoroisopropanol (HFIP) at room temperature over 24 h. The solution was filtered through a PTFE membrane filter (pore size: 3 μm) having a known weight, and then the filter was washed with HFIP. The filter was dried by a hot-air dryer at 120° C. for 30 min and weighed to calculate a weight percentage of HFIP insolubles, the calculated value being taken as the gel concentration.

(9) Fuel Permeability

The polyamide resin was charged into a 20 mmφ single-screw extruder and extruded at 170 to 220° C. into a film of 70 μm thick. Two pieces of 11 cm× 13 cm films taken from the obtained film were superimposed with one on the other and then heat-sealed at three sides with a sealing width of 10 mm to form a bag. After filled with 60 g of fuel (isooctane/toluene/ethanol=40/40/20 by volume), the bag was heat-sealed at the opening with a sealing width of 10 mm. The fuel-filled bag was allowed to stand in am explosion-proof type constant temperature & humidity chamber under conditions of 40° C./65% RH. The weight of the fuel-filled bag was measured every day to record the change in weight per day. The maximum change in weight per day was taken as the fuel permeation per day.

EXAMPLE 1

Into a jacketed 50-L reaction vessel equipped with a stirrer, a partial condenser, a cooler, a dropping tank and a nitrogen inlet, were charged 7 kg (47.89 mol) of adipic acid and 3.4 kg (20.53 mol) of isophthalic acid. The inner atmosphere was fully replaced with nitrogen, and the contents were made into a uniform slurry of isophthalic acid particles in molten adipic acid at 160° C. in a small stream of nitrogen. To the molten mixture, was added dropwise 9.2 kg (67.29 mol) of m-xylylenediamine under stirring over 170 min. During the addition, the inner temperature was continuously raised to 247° C. The water which was produced as the addition of m-xylylenediamine proceeded was removed from the reaction system through the partial condenser and the cooler. After completion of adding m-xylylenediamine, the inner temperature was raised to 260° C. and the reaction was continued for one hour. The resultant polymer in the form of strand was taken out of the reaction vessel through a lower nozzle, water-cooled and then cut into pellets to obtain Polyamide 1. After vacuum-drying Polyamide 1 at 80° C. for 72 h, the end amino concentration, end carboxyl concentration, reaction molar ratio, relative viscosity, water content, melting point, melt viscosity, gel concentration and fuel permeability were measured. The results are shown in Table 1.

EXAMPLE 2

Into a reaction vessel, were charged 11.9 kg (81.65 mol) of adipic acid and 3.4 kg (20.73 mol) of isophthalic acid. The inner atmosphere was fully replaced with nitrogen, and the contents were made into a uniform slurry at 160° C. in a small stream of nitrogen. To the molten mixture, was added dropwise 13.7 kg (100.739 mol) of m-xylylenediamine under stirring over 160 min. Thereafter, by following the same procedure as in Example 1, Polyamide 2 was obtained. The results are shown in Table 1.

EXAMPLE 3

Into a reaction vessel, were charged 6.0 kg (41.20 mol) of adipic acid and 4.6 kg (27.47 mol) of isophthalic acid. The inner atmosphere was fully replaced with nitrogen, and the contents were made into a uniform slurry at 160° C. in a small stream of nitrogen. To the molten mixture, was added dropwise 9.2 kg (67.29 mol) of m-xylylenediamine under stirring over 160 min. Thereafter, by following the same procedure as in Example 1, Polyamide 3 was obtained. The results are shown in Table 1.

TABLE 1

| | Examples | | |
|---|---|---|---|
| | 1 | 2 | 3 |
| Polyamide 1 (wt part) | 100 | — | — |
| Polyamide 2 (wt part) | — | 100 | — |
| Polyamide 3 (wt part) | — | — | 100 |
| End amino concentration (μequiv/g) | 57 | 55 | 58 |
| End carboxyl concentration (μequiv/g) | 109 | 102 | 134 |
| Reaction molar ratio | 0.993 | 0.994 | 0.990 |
| Relative viscosity ($\eta_r$) | 1.73 | 1.90 | 1.75 |
| Water content (%) | 0.08 | 0.05 | 0.08 |
| Melting point (° C.) | 185 | 207 | — |
| Melt viscosity (Pa · s) | 2300 | 1500 | 2700 |
| Gel concentration (%) | 0 | 0 | 0 |
| Fuel permeability (g/bag · day) | 0.6 | 0.7 | 0.5 |
| Measuring period for fuel permeability (days) | 2 to 3 | 2 to 3 | 2 to 3 |

EXAMPLE 4

Into a reaction vessel, were charged 12.0 kg (82.11 mol) of adipic acid and 3.4 kg (20.53 mol) of isophthalic acid. The inner atmosphere was fully replaced with nitrogen, and the contents were made into a uniform slurry at 160° C. in a small stream of nitrogen. To the molten mixture, was added dropwise 13.9 kg (102.20 mol) of m-xylylenediamine under stirring over 160 min. Thereafter, by following the same procedure as in Example 1, Polyamide 4 was obtained. The results are shown in Table 2.

TABLE 2

| | Example 4 |
|---|---|
| Polyamide 4 (wt part) | 100 |
| End amino concentration (μequiv/g) | 86 |
| End carboxyl concentration (μequiv/g) | 65 |
| Reaction molar ratio | 1.003 |
| Relative viscosity ($\eta_r$) | 1.95 |
| Water content (%) | 0.08 |
| Melting point (° C.) | 207 |
| Melt viscosity (Pa · s) | 1600 |
| Gel concentration (%) | 0 |

TABLE 2-continued

|  | Example 4 |
| --- | --- |
| Fuel permeability (g/bag · day) | 0.7 |
| Measuring period for fuel permeability (days) | 2 to 3 |

EXAMPLE 5

Into a reaction vessel, were charged 6.5 kg (44.63 mol) of adipic acid, 3.4 kg (20.60 mol) of isophthalic acid and 0.6 kg (3.43 mol) of terephthalic acid. The inner atmosphere was fully replaced with nitrogen, and the contents were made into a uniform slurry of particles of isophthalic acid terephthalic acid in molten adipic acid at 160° C. in a small stream of nitrogen. To the molten mixture, was added dropwise 9.2 kg (67.29 mol) of m-xylylenediamine under stirring over 160 min. Thereafter, by following the same procedure as in Example 1, Polyamide 5 was obtained. The results are shown in Table 3.

EXAMPLE 6

A dry blend of 97 parts by weight of the polyamide 2 obtained in Example 2 and 3 parts by weight of montmorillonite ("Orben" (tradename) available from Shiraishi Kogyo Co., Ltd.) was fed at a rate of 12 kg/hr from a metering feeder into a twin-screw extruder of a cylinder diameter of 37 mm equipped with a strong knead screw having a dwelling zone formed by a reverse flighted element. The blend was melt-kneaded under conditions of a cylinder temperature of 210° C., a screw rotation speed of 300 rpm and a dwelling time of 90 s. The molten strand from the extruder was cooled by a cooling air, solidified and then pelletized to obtain Resin Composition 1, which was evaluated for the relative viscosity, water content, melt viscosity, gel concentration and fuel permeability. The results are shown in Table 3.

EXAMPLE 7

Resin Composition 2 was prepared by repeating the procedure of Example 6 except that a dry blend of 95 parts by weight of the Polyamide 2 obtained in Example 2 and 5 parts by weight of montmorillonite ("Orben" (tradename) available from Shiraishi Kogyo Co., Ltd.) was used. Resin Composition 2 was evaluated for the relative viscosity, water content, melt viscosity, gel concentration and fuel permeability. The results are shown in Table 3.

TABLE 3

|  | Examples | | |
| --- | --- | --- | --- |
|  | 5 | 6 | 7 |
| Polyamide 2 (wt part) | — | 97 | 95 |
| Polyamide 5 (wt part) | 100 | — | — |
| Montmorillonite (wt part) | — | 3 | 5 |
| End amino concentration (µequiv/g) | 55 | — | — |
| End carboxyl concentration (µequiv/g) | 118 | — | — |
| Reaction molar ratio | 0.991 | — | — |
| Relative viscosity ($\eta_r$) | 1.70 | 1.91 | 1.93 |
| Water content (%) | 0.08 | 0.07 | 0.07 |
| Melting point (° C.) | — | — | — |
| Melt viscosity (Pa · s) | 2100 | 2100 | 2600 |
| Gel concentration (%) | 0 | 12 | 16 |
| Fuel permeability (g/bag · day) | 0.6 | 0.5 | 0.4 |
| Measuring period for fuel permeability (days) | 2 to 3 | 3 to 4 | 3 to 4 |

EXAMPLE 8

Into a jacketed 50-L reaction vessel equipped with a stirrer, a partial condenser, a cooler, a dropping tank and a nitrogen inlet, were charged 8 kg (54.77 mol) of adipic acid and 3 kg (13.69 mol) of 2,6-naphthalenedicarboxylic acid. The inner atmosphere was fully replaced with nitrogen, and the contents were made into a uniform slurry at 160° C. in a small stream of nitrogen. To the molten mixture, was added dropwise 9.2 kg (67.29 mol) of m-xylylenediamine under stirring over 160 min. During the addition, the inner temperature was continuously raised to 250° C. The water which was produced as the addition of m-xylylenediamine proceeded was removed from the reaction system through the partial condenser and the cooler. After completion of adding m-xylylenediamine, the inner temperature was raised to 260° C. and the reaction was continued for one hour. The resultant polymer in the form of strand was taken out of the reaction vessel through a lower nozzle, water-cooled and then cut into pellets to obtain Polyamide 6. After vacuum-drying Polyamide 6 at 80° C. for 72 h, the end amino concentration, end carboxyl concentration, reaction molar ratio, relative viscosity, water content, melting point, melt viscosity, gel concentration and fuel permeability were measured. The results are shown in Table 4.

EXAMPLE 9

Into a reaction vessel, were charged 7 kg (47.9 mol) of adipic acid, 3 kg (13.69 mol) of 2,6-naphthalenedicarboxylic acid and 1.1 kg (6.84 mol) of isophthalic acid. The inner atmosphere was fully replaced with nitrogen, and the contents were made into a uniform slurry at 160° C. in a small stream of nitrogen. To the molten mixture, was added dropwise 9.2 kg (67.29 mol) of m-xylylenediamine under stirring over 160 min. Thereafter, by following the same procedure as in Example 8, Polyamide 7 was obtained. The results are shown in Table 4.

EXAMPLE 10

A dry blend of 97 parts by weight of Polyamide 6 obtained in Example 8 and 3 parts by weight of montmorillonite ("Orben" (tradename) available from Shiraishi Kogyo Co., Ltd.) was fed at a rate of 12 kg/hr from a metering feeder into a twin-screw extruder of a cylinder diameter of 37 mm equipped with a strong knead screw having a dwelling zone formed by a reverse flighted element. The blend was melt-kneaded under conditions of a cylinder temperature of 220° C., a screw rotation speed of 300 rpm and a dwelling time of 90 s. The molten strand from the extruder was cooled by a cooling air, solidified and then pelletized to obtain Resin Composition 3, which was evaluated for the relative viscosity, water content, melt viscosity, gel concentration and fuel permeability. The results are shown in Table 4.

TABLE 4

|  | Examples | | |
| --- | --- | --- | --- |
|  | 8 | 9 | 10 |
| Polyamide 6 (wt part) | 100 | — | — |
| Polyamide 7 (wt part) | — | 100 | — |
| Resin composition 3 (wt part) | — | — | 100 |
| End amino concentration (μequiv/g) | 75 | 67 | — |
| End carboxyl concentration (μequiv/g) | 95 | 128 | — |
| Reaction molar ratio | 0.998 | 0.993 | — |
| Relative viscosity ($\eta_r$) | 1.89 | 1.76 | 1.93 |
| Water content (%) | 0.08 | 0.08 | 0.08 |
| Melting point (° C.) | 220 | — | — |
| Melt viscosity (Pa · s) | 320 | 490 | 450 |
| Gel concentration (%) | 0 | 0 | 12 |
| Fuel permeability (g/bag · day) | 0.5 | 0.5 | 0.4 |
| Measuring period for fuel permeability (days) | 2 to 3 | 2 to 3 | 3 to 4 |

COMPARATIVE EXAMPLE 1

The same procedure as in Example 1 was repeated except that nylon MXD6 ("#6007" (tradename) available from Mitsubishi Gas Chemical Company, Inc.) was used. The results are shown in Table 5.

COMPARATIVE EXAMPLE 2

The same procedure as in Example 1 was repeated except that ethylene-vinyl alcohol copolymer ("EVAL F-101B" (tradename) available from Kuraray Co., Ltd.) was used. The results are shown in Table 5.

COMPARATIVE EXAMPLE 3

The same procedure as in Example 1 was repeated except that nylon 6 copolymer ("Amilan CM6246" (tradename) available from Toray Industries) was used. The results are shown in Table 5.

TABLE 5

|  | Comparative Examples | | |
| --- | --- | --- | --- |
|  | 1 | 2 | 3 |
| N-MXD6 (wt part) | 100 | — | — |
| EVOH (wt part) | — | 100 | — |
| Nylon 6 copolymer (wt part) | — | — | 100 |
| End amino concentration (μequiv/g) | 28 | — | 33 |
| End carboxyl concentration (μequiv/g) | 56 | — | 78 |
| Reaction molar ratio | 0.997 | — | 0.995 |
| Relative viscosity ($\eta_r$) | 2.63 | — | 4.3 |
| Water content (%) | 0.05 | — | — |
| Melting point (° C.) | 240 | 183 | 191 |
| Melt viscosity (Pa · s) | 1900 | 1800 | 3100 |
| Gel concentration (%) | — | — | 72 |
| Fuel permeability (g/bag · day) | 0.9 | 1.1 | 7.3 |
| Measuring period for fuel permeability (days) | 2 to 3 | 7 to 8 | 0 to 1 |

EXAMPLE 11

Resin Composition 1 obtained in Example 6, a high-density polyethylene ("Novatec HD-HY540" available from Japan Polyethylene Corporation; MFR=1.0 g/10 min at 190° C./2160 g), and an adhesive resin ("Admer GT6" available from Mitsui Chemicals, Inc.; MFR=0.94 g/10 min at 190° C./2160 g) were respectively charged into an extruder and extruded into a multilayer sheet having a laminate structure of high-density polyethylene/adhesive resin/resin composition/adhesive resin/high-density polyethylene=30 μm/10 μm/70 μm/10 μm/30 μm. Two pieces of 11 cm×13 cm sheet taken from the obtained sheet were superimposed with one on the other and then heat-sealed at three sides with a sealing width of 10 mm to form a bag. After filled with 100 g of fuel (isooctane/toluene/ethanol=45/45/10 by volume), the bag was heat-sealed at the opening with a sealing width of 10 mm. The fuel-filled bag was allowed to stand in an explosion-proofed thermo-hygrostat under conditions of 40° C./65% RH. The weight of the fuel-filled bag was measured every one week to calculate the change in weight per day. The maximum change in weight per day was taken as the fuel permeability per day. The results are shown in Table 6.

EXAMPLE 12

The same procedure as in Example 11 was repeated except for using Resin Composition 2 obtained in Example 7. The results are shown in Table 6.

TABLE 6

|  | Examples | |
| --- | --- | --- |
|  | 11 | 12 |
| Fuel permeability (g/m$^2$ · day) | 0.18 | 0.16 |
| Measuring period for fuel permeability (weeks) | 3 to 4 | 3 to 4 |

EXAMPLE 13

The same procedure as in Example 11 was repeated except for using Polyamide 6 obtained in Example 8. The results are shown in Table 7.

EXAMPLE 14

The same procedure as in Example 11 was repeated except for using Resin Composition 3 obtained in Example 10. The results are shown in Table 7.

COMPARATIVE EXAMPLE 4

The same procedure as in Example 11 was repeated except for using ethylene-vinyl alcohol copolymer ("EVAL F-101B" (tradename) available from Kuraray Co., Ltd.) was used. The results are shown in Table 7.

TABLE 7

|  | Examples | | Comparative Example |
| --- | --- | --- | --- |
|  | 13 | 14 | 4 |
| Fuel permeability (g/m$^2$ · day) | 0.14 | 0.12 | 0.23 |
| Measuring period for fuel permeability (weeks) | 3 to 4 | 3 to 4 | 5 to 6 |

The polyamide resin of the present invention is excellent in not only fuel-barrier property and heat resistance, but also moldability and recyclability, and therefore suitably used as a barrier material for fuel containers. Accordingly, the present invention has a large industrial value.

What is claimed is:

1. A fuel-barrier multilayer molded article comprising a laminated structure of a layer made of a polyamide resin and a high-density polyethylene, wherein the polyamide resin is a polyamide resin produced by the polycondensation of a diamine component comprising 70 mol % or higher of m-xylylenediamine and a dicarboxylic acid component comprising 70 mol % or higher of a mixed dicarboxylic acid which comprises a $C_4$ to $C_{20}$ α,ω-linear aliphatic dicarboxylic acid and at least one dicarboxylic acid selected from the group consisting of isophthalic acid and naphthalenedicarboxylic acid in a molar ratio of 30:70 to 95:5.

2. The fuel-barrier multilayer molded article according to claim 1, wherein the polyamide resin contains smectite treated with an organic swelling agent in an amount of 1 to 20% by weight based on a total weight of the polyamide resin and the smectite.

3. The fuel-barrier multilayer molded article according to claim 1, wherein the mixed dicarboxylic acid is a mixture of the $C_4$ to $C_{20}$ α,ω-linear aliphatic dicarboxylic acid and isophthalic acid in a molar ratio of 3:7 to 9:1.

4. The fuel-barrier multilayer molded article according to claim 3, wherein the polyamide resin has a melting point of 160 to 220° C.

5. The fuel-barrier multilayer molded article according to claim 3, wherein the polyamide resin has a melt viscosity of 1000 to 5000 Pa·s when measured at a molding temperature and a shear rate of 100 sec$^{-1}$.

6. The fuel-barrier multilayer molded article according to claim 1, wherein the mixed dicarboxylic acid is a mixture of the $C_4$ to $C_{20}$ α,ω-linear aliphatic dicarboxylic acid and naphthalenedicarboxylic acid.

7. The fuel-barrier multilayer molded article according to claim 6, wherein the polyamide resin has a melting point of 160 to 225° C.

8. The fuel-barrier multilayer molded article according to claim 6, wherein the polyamide resin has a melt viscosity of 200 to 5000 Pa·s when measured at a molding temperature and a shear rate of 100 sec$^{-1}$.

9. The fuel-barrier multilayer molded article according to claim 1, wherein said laminated structure has a layer made of said polyamide resin and a layer of the high-density polyethylene.

10. The fuel-barrier multilayer molded article according to claim 9, wherein an adhesive resin layer is provided between each pair layers of the layer made of said polyamide resin and said layer of the high-density polyethylene.

11. The fuel-barrier multilayer molded article according to claim 9, wherein the layer made of said polyamide resin has a thickness of 0.001 to 1 mm, and the layer of the high-density polyethylene has a thickness of 0.01 to 20 mm.

12. The fuel-barrier multilayer molded article according to claim 1, which comprises a blend of the polyamide resin and high-density polyethylene in said layer.

13. The fuel-barrier multilayer molded article according to claim 6, wherein said mixed dicarboxylic acid includes the $C_4$ to $C_{20}$ α,ω-linear aliphatic dicarboxylic acid and the naphthalenedicarboxylic acid in a molar ratio of 40:60 to 90:10.

14. The fuel-barrier multilayer molded article according to claim 1, wherein the high-density polyethylene is ultra-high-molecular high-density polyethylene.

15. The fuel-barrier multilayer molded article according to claim 9, wherein the high-density polyethylene is ultra-high-molecular high-density polyethylene.

16. The fuel-barrier multilayer molded article according to claim 1, wherein said layer is capable of being a barrier material for fuel containers.

17. The fuel-barrier multilayer molded article according to claim 9, wherein said layer made of said polyamide resin is capable of being a barrier material for fuel containers.

* * * * *